June 19, 1945.  F. A. SCHULTZ  2,378,586
MOLDING APPARATUS
Filed Nov. 7, 1942

INVENTOR
F. A. SCHULTZ
BY Harry L. Duft
ATTORNEY

Patented June 19, 1945

2,378,586

UNITED STATES PATENT OFFICE 2,378,586

MOLDING APPARATUS

Frank A. Schultz, Chicago, Ill., assignor to Western Electric Company, Incorporated, New York, N. Y., a corporation of New York Application November 7, 1942, Serial No. 464,865

5 Claims. (Cl. 18—42)

This invention relates to molding apparatus, and more particularly to an apparatus for molding hollow articles.

In the manufacture of molded articles, because trapped air and gases tend to cause bubbles or other imperfections in the molded articles, some means must be provided for venting the die cavities in order to obtain a satisfactory molded article. Since, under the high extrusion pressures used in molding and particularly in injection molding, the molding material will pass through an extremely small aperture, considerable care must be exercised in the selection of a vent opening in order to prevent molding material from being extruded through the vent, while at the same time providing a sufficient aperture to permit the trapped gases to escape with sufficient rapidity.

An object of the present invention is to provide an efficient and effective apparatus for molding hollow articles.

In accordance with one embodiment of the present invention, a sectional molding die may be provided having runners extending laterally along the dividing line of the die to mold cavities formed in the die sections. A core pin forms the center portion of each cavity and a venting aperture extends longitudinally through the core pin to permit escape of trapped gases. The aperture entrance is tapered to make the vent self-cleaning.

Other objects and advantages of the present invention will be apparent from the following detailed description taken in conjunction with the drawing, wherein.

This invention will be described in connection with the molding of hollow plungers such as used in certain types of telephone hand sets. However, it will be understood that the invention is applicable to the molding of many other types of hollow articles.

Figure 1:
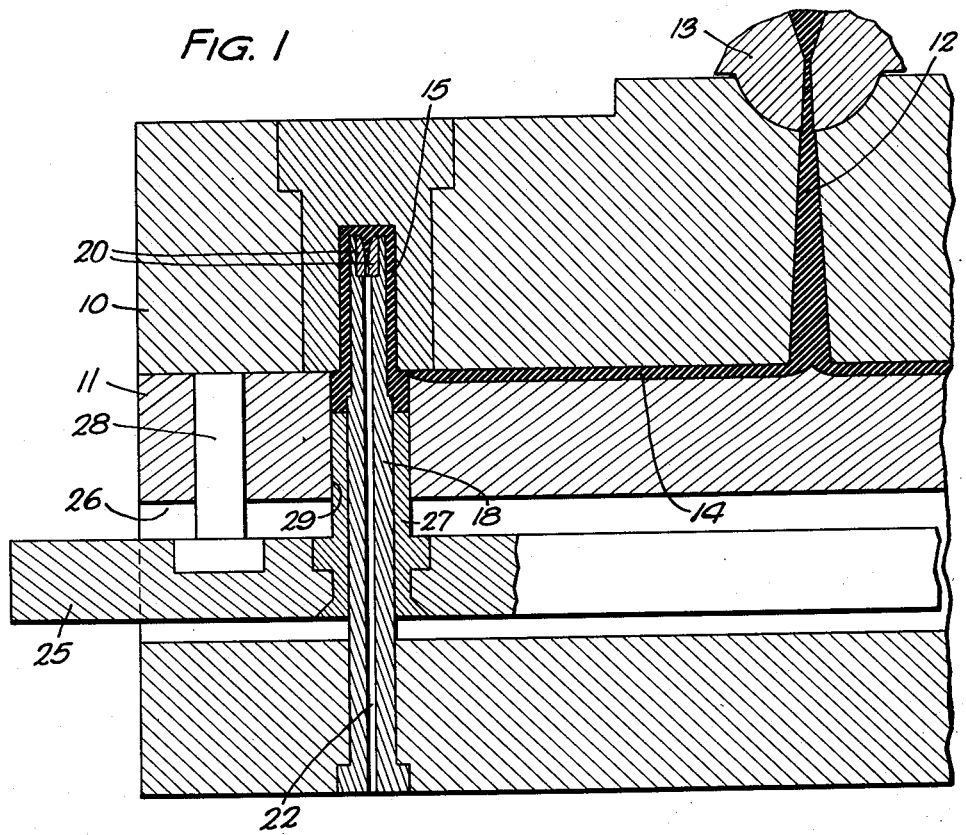
Fig. 1 is a fragmentary, vertical, sectional view of a molding die constructed in accordance with this invention.

Referring now to the drawing, Fig. 1 shows a part of a molding die having an upper die section 10 and a lower die section 11. A tapering sprue chamber 12 is formed in the upper die section to admit molding material from an extrusion head 13, shown fragmentarily, and a runner 14 extends laterally on the dividing line of the die from the base of the sprue chamber to a die cavity 15 formed partially in the upper and partially in the lower die sections. It will be noted that the sprue chamber 12 is wider at its base than at its top. This facilitates the removal of the sprue material when the die sections are separated in removing the molded articles or articles from the die sections. The runner 14 may be formed in either the upper or lower die section or both sections may cooperate to form the runner. It will be noted also that the runner 14 tapers abruptly at the point at which it joins the die cavity. This tapering is resorted to in order to reduce the size of the runner at this point and, consequently, the size of the rough area which necessarily results when the runner material is broken off from the molded article. In turn, the amount of polishing which will be subsequently required is minimized.

The molding die shown in Fig. 1 is intended to form a hollow molded article. A core pin 18 is positioned in the lower die section and extends from the base thereof through the cavity 15 to form the center portion of the cavity, as may be seen in Fig. 1. In a molding die of the design shown, that is to say, a molding die in which the runner joins the die cavity at a point substantially below the top of the cavity, the molding material will tend first to fill the base of the cavity, and thus to trap air or gas in the upper portion thereof as it moves upwardly under the extrusion pressure. Unless this air is permitted to escape, bubbles and other imperfections may occur in the final molded article. Since the trapped gases are confined to the upper portion of the die cavity, it is desirable to provide a venting means in that area.

Figure 2:
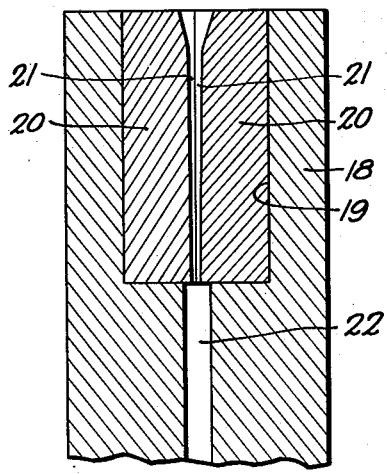
Fig. 2 is an enlarged detail view of the upper portion of the core pin used with this die.
Figure 3:
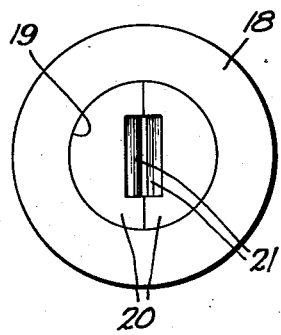
Fig. 3 is a plan view of the core pin shown in Fig. 2.
Figure 4:
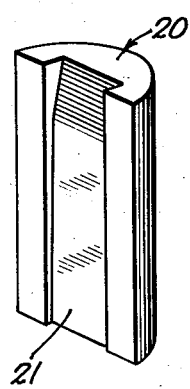
Fig. 4 is a perspective view of an insert used with this core pin.

As may be seen in Figs. 2 and 3, the upper interior portion of the core pin 18 is provided with a cylindrical chamber 19, the base of which is shouldered to support a pair of semi-cylindrical inserts 20 which are shown in detail in Fig. 4. A slot 21 is ground into the flat inner surface of each of these inserts and extends longitudinally along the insert from end to end. The entire slotted portion is tapered slightly, as may be seen in Fig. 2, but the upper portion thereof tapers abruptly to facilitate the removal of molding material. When these inserts are assembled together in the cylindrical chamber formed in the upper portion of the core pin, they cooperate to form a venting aperture, rectangular in cross section and tapering inwardly. This aperture communicates with a second aperture 22 which extends longitudinally through the core pin from the base thereof to the chamber 21. A venting aperture which is rectangular in cross section is desirable since it permits control of the thickness of the aperture while, at the same time, allowing control of the width.

Molding material, it has been found, will not pass through an aperture smaller than a certain minimum; for example, cellulose acetate will not pass through an aperture smaller than .003" under extrusion pressures under 35,000 pounds per square inch. However, air will pass through an even thinner aperture. Increasing the width of the aperture but not the thickness, permits increasing of the rapidity with which the air or gas may escape without enabling the molding material to escape. The maximum depth to which the slotted portion should be ground in any particular case depends on the extrusion pressure to be used and the type of molding material being extruded. The width of the slotted portion, however, will depend largely on the size of the molding cavity and the amount of trapped air to be removed. Ordinarily, the width of the slot is made as great as feasible.

In practice it has been found in molding thermoplastic materials, such as acetates, butyrates and methacrylates, under pressures on the order of 30,000 pounds per square inch, a maximum thickness of approximately .005" at the narrowest portion of the rectangular aperture formed by the slotted portions will effectively prevent molding material from escaping through the vent while, at the same time, permitting rapid escape of the trapped gases. With higher extrusion pressures or with material of lower viscosity, somewhat smaller thicknesses must be used, the figures given being merely illustrative. The exact size to be used should be determined individually for each set of molding conditions.

It will be understood that instead of using the sectional insert in the upper portion of the core pin 18, an aperture of the desired size might be drilled through the core pin. However, where apertures of small size are to be formed, it is somewhat simpler to grind slots into the interior surfaces of a pair of inserts, as shown, than to drill an aperture because of the necessary hardness of the metal used. Furthermore, as noted, a rectangular aperture permits somewhat more facile control of the venting. It will also be understood that the core pin might be split in two sections and the upper portion of each section ground to the desired width and depth without departing from the spirit or scope of the present invention.

In order to facilitate ejection of the molded article after completion of the molding operation, an ejecting means actuated by the separation of the die sections is provided. An ejector bar 25, positioned in a rectangular aperture 26 which extends laterally through the lower die section 11, supports an ejector sleeve 27 mounted perpendicularly thereon. This sleeve extends through an aperture 29 formed in the portion of the lower die section above the aperture 26 to form the base of the mold cavity 15 when the die sections are closed, and also to serve as the ejecting means when the lower die section is lowered. Means are, of course, provided to engage the base of the ejector bar 25 as the lower die section is moved downwardly away from the upper die section to actuate the ejector sleeve.

A reset rod 28 is slidably mounted in the upper portion of the lower die section 11 and extends therethrough to contact the base of the upper die section 10. When the sections are separated and the ejector bar 25 elevated relatively to the lower die section, the reset rod 28 will extend a short distance above the surface of the lower die section. However, when the die sections are brought together, the end of the reset rod will be brought level with the surface of the lower die section, as may be seen in Fig. 1, thus withdrawing the sleeve 27 and positioning it properly in the mold cavity.

In the operation of this apparatus, some molding material may be extruded into the tapering orifice of the vent. For the particular use for which this particular apparatus is designed, the small flash so formed is of no serious import. However, it will be apparent that, if desired, this flash may be burred off to produce a perfectly smooth surface.

While but one embodiment of this invention has been shown and described, it will be understood that many changes and modifications may be made therein without departing from the spirit or scope of the present invention.

What is claimed is:

1. In a molding die, said die having a die cavity, a core pin inside of said cavity having a venting aperture extending through said core pin, said venting aperture being rectangular in cross section and tapering inwardly.

2. In a molding die, said die having a die cavity, a core pin in said cavity, one end of said core pin being chambered and shouldered to receive an insert, and an insert for said core pin having an aperture extending therethrough, said aperture being rectangular in cross section and tapering inwardly.

3. In a molding die, said die having a die cavity, a core pin in said cavity, the upper portion of said pin being chambered and shouldered to receive a sectional insert, and a sectional insert having slotted portions formed therein, said slotted portions cooperating when said sections are assembled in said core pin to form a venting aperture of rectangular cross section.

4. In a molding die, said die having a die cavity, a core pin in said cavity, the upper portion of said pin being chambered and shouldered to receive a sectional insert, and a sectional insert having slotted portions formed therein cooperating when said sections are assembled in said core pin to form a venting aperture, said aperture tapering inwardly and being rectangular in cross section.

5. A molding die having a molding chamber formed therein, a core pin positioned in said chamber, said pin having a recess formed in the upper end thereof and an aperture extending from said recess to the opposite end of said pin, and a pair of substantially semi-cylindrical inserts in said recess, the flattened faces of said inserts having longitudinally extending slots formed therein which cooperate to form a venting aperture, said venting aperture communicating with the aperture in said core pin and being rectangular in cross section but tapering inwardly to make the venting aperture self-cleaning.

FRANK A. SCHULTZ.